United States Patent [19]
Parker et al.

[11] 3,740,097
[45] June 19, 1973

[54] VEHICLE DUMP BED

[75] Inventors: Shirley L. Parker, Warsaw; John D. Rohrer, North Manchester, both of Ind.

[73] Assignee: Parker Industries Inc., Silver Lake, Ind.

[22] Filed: May 3, 1971

[21] Appl. No.: 139,565

[52] U.S. Cl............................... 298/1 A, 298/22 P
[51] Int. Cl............................................. B60p 1/16
[58] Field of Search.................. 298/1 A, 10, 22 R, 298/22 P

[56] References Cited
UNITED STATES PATENTS

| | | | |
|---|---|---|---|
| 2,674,489 | 4/1954 | Maxon | 298/22 X |
| 3,424,498 | 1/1969 | Maxon | 298/22 P |
| 3,447,834 | 6/1969 | Grosse-Rhode | 298/22 R |
| 3,358,224 | 9/1944 | Golay | 298/1 A |
| 3,633,971 | 1/1972 | Berky | 298/10 |
| 3,488,077 | 1/1970 | Miller | 298/38 X |

*Primary Examiner*—Richard J. Johnson
*Attorney*—Hobbs & Green and Kemon, Palmer & Estabrook

[57] ABSTRACT

A dump bed for a vehicle such as a pick-up truck which can be easily mounted on and removed from the vehicle bed, and which includes a pair of uprights secured near the rear end of the dump bed body for moving the dump bed body between a horizontal and substantially vertical position. A hydraulic system incorporated in the base of the dump bed structure performs the dumping action. The bed is provided with fixtures for lifting a refuse container as the bed is lowered, for transporting the container from one place to another.

7 Claims, 11 Drawing Figures

PATENTED JUN 19 1973 3,740,097

*INVENTORS*
SHIRLEY L. PARKER
JOHN D. ROHRER

BY *Hobbs & Green*

ATTORNEYS

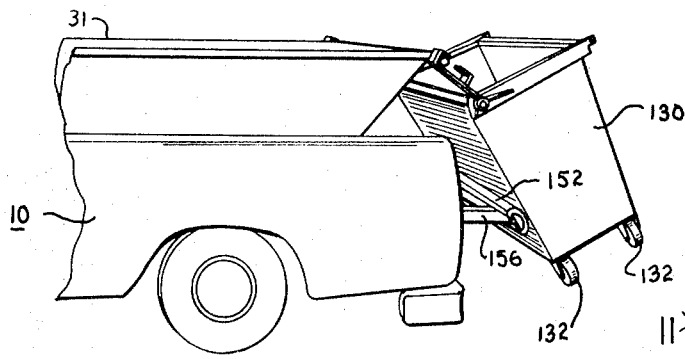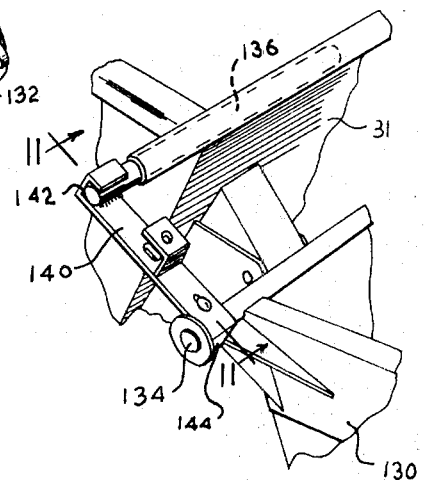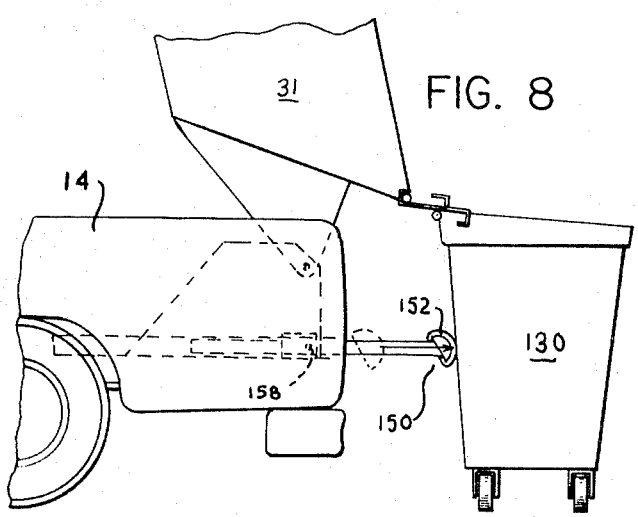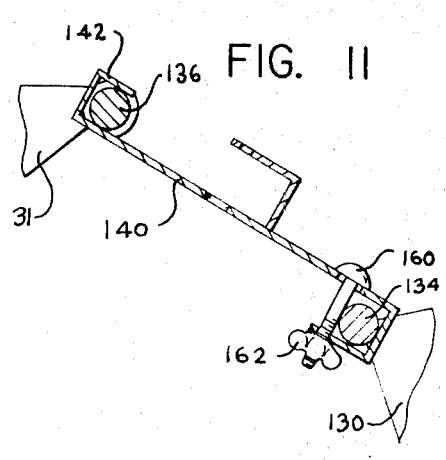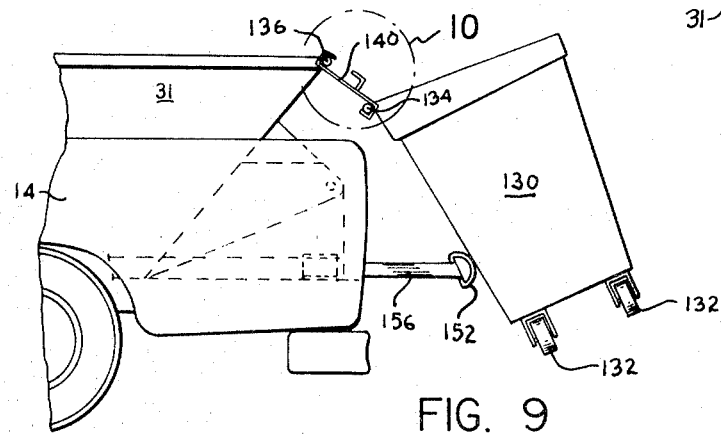

VEHICLE DUMP BED

Normally, in disposing of commercial and industrial rubbish and refuse, the material is collected in large, generally rectangular containers, and when the containers are full, the material is removed by emptying the material into a refuse truck especially designed for loading and hauling such material. Often the refuse disposal operations are relatively small and in limited areas and do not require the specially built hauling vehicle equipment which is large in size, expensive to operate, and difficult to maneuver in the limited areas, and which is designed for and capable of performing only a single kind of hauling operation. It is therefore one of the principal objects of the present invention to provide a refuse dump bed which can readily be mounted in a conventional pick-up truck bed and easily and quickly removed therefrom, and which can be controlled and power operated by a system separate from the truck.

Another object of the invention is to provide a vehicle dump bed which can be mounted on and attached to the vehicle and removed therefrom without the use of any special tools or equipment, and which is so constructed and designed that it will haul a full load and fully dump the load without removing or opening a tail gate or other door.

Still another object of the invention is to provide a refuse dump bed for trucks, which can be operated to lift refuse containers and hold the containers firmly in a suspended, substantially upright position while they are being transported from one place to another and which has a mechanism for use in conjunction with the bed for positioning a refuse container while it is being transported by the vehicle, the mechanism being extensible to the rear of the vehicle to assist in holding the container, and retractable to a position where the bed can operate fully without interference from the mechanism.

A further object is to provide a relatively simple, easily installed and operated dump bed for pick-up trucks and similar vehicles, which can be used to collect and haul rubbish and refuse and to discharge the rubbish and refuse directly into the receiving apparatus of a large refuse transporting truck.

Additional objects and advantages of the invention will become apparent from the following description and accompanying drawings, wherein:

FIG. 7 is a fragmentary perspective view of the pick-up truck dump bed and a refuse container, illustrating the manner in which the refuse container is transported by the truck;

FIG. 8 is a fragmentary side elevational view of the pick-up truck dump bed and a full side elevational view of a container, showing the manner in which the container is lifted for transporting;

FIG. 9 is a side elevational view of the truck bed and container illustrating more fully the manner in which the container is lifted and transported;

FIG. 10 is a perspective view of the portion of the mechanism used by the bed in lifting a refuse container; and FIG. 11 is an enlarged cross sectional view through a portion of the mechanism shown in FIG. 10, the section being taken on line 11—11 of FIG. 10.

Figure 1:
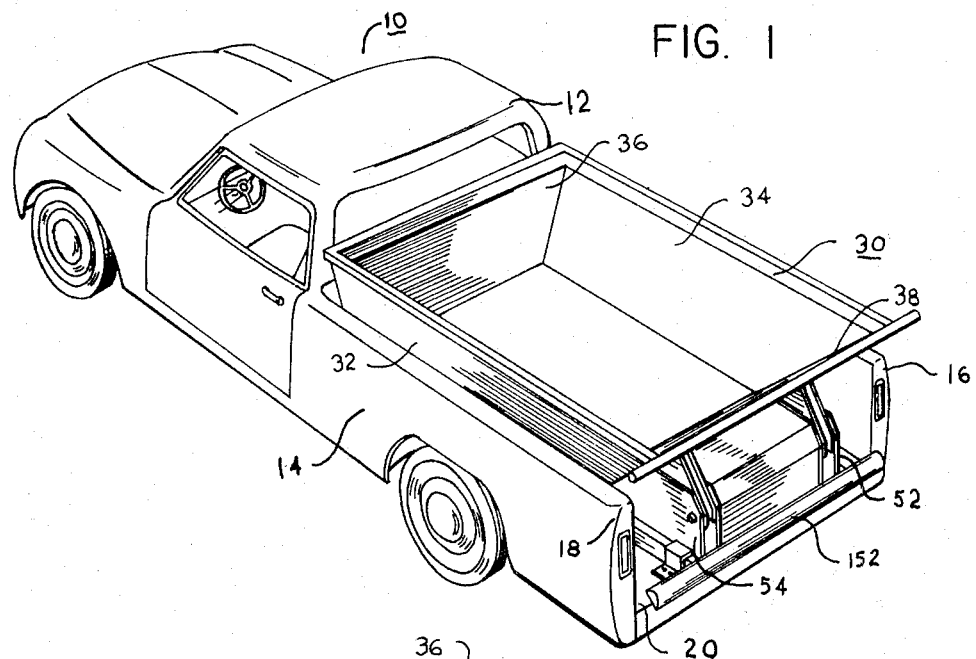
FIG. 1 is a perspective view of a pick-up truck on which the present dump bed has been mounted in operative position.

Referring more specifically to the drawings, numeral 10 indicates generally a pick-up truck including a cab 12 and a bed 14, the bed shown having sides 16 and 18 and a floor or bottom 20, with the standard or conventional tail gate or door removed therefrom. The present dump bed, indicated by numeral 30, is shown mounted in the truck bed in its lowered, load hauling position. For the purpose of the present invention, the pick-up truck shown in the drawings may be considered as conventional or standard; however, the dump bed 30 may be used on other types of vehicles if desired.

The dump bed 30 includes a body 31 formed by sloping side walls 32 and 34, vertical front wall 36, upwardly and outwardly sloping rear wall 38, and a bottom 40, the side walls, end walls and bottom being constructed of sheet metal and preferably joined to one another, either integrally or by welding, to form a rigid structure. A reinforcing railing or flange 42 is preferably provided around the upper edges of the walls.

The body 30 is supported on a base generally indicated by numeral 50, having uprights 52 and 54 on each side connected to one another by upper horizontal member 56 and lower horizontal members 58 and 60, the three members being joined to the uprights by welding or other suitable rigid securing means. Each of the uprights has upper and lower sections, the lower section of upright 52 being constructed of spaced outer plate 62 and inner plate 64, and the lower section of upright 54 being constructed of outer plate 66 and inner plate 68. The plates of each lower section are held in rigid spaced relation by a plurality of spaced members 70. The upper section 72 of upright 52 consists of plates 76 and 78 joined rigidly to the underside of the bed, and the upper section 74 of upright 54 of plates 80 and 82, likewise joined to the underside of the bed, the pivoted upper sections being mounted on pivot pins 84 and 86 of uprights 52 and 54, respectively. Thus, the body is capable of tilting from its lowered position shown in FIG. 1 to its elevated position illustrated in FIG. 2, wherein the rear end plate 38 is sloping downwardly so that the load in the body may be easily and fully discharged.

The body is tilted between the loading and unloading positions by a pair of hydraulic cylinders 90 and 92 on uprights 52 and 54, respectively. The lower end of cylinder 90 is pivotally connected to the upright 52 by a pivot pin 94 extending between plates 62 and 64 and cylinder 92 is pivotally connected to upright 54 by pivot pin 96 extending between plates 66 and 68. The piston in the cylinder 90 is connected to pivoted upper section 72 by a rod 98 and a pivot pin 100, and the piston in cylinder 92 is connected to pivoted section 74 by a rod 102 and pivot pin 104. The two hydraulic cylinders are operated from a unit 110 mounted on cross members 58 and 60 of the rigid base which includes a control valve and a hydraulic pump 112 driven by an electric motor in housing 114. The hydraulic pump is connected to the two cyclinders by conduits 116 and 118 and a manual means not shown, for controlling the operation of the hydraulic system is connected to the electric motor and control valve in housing 114. The control means and valve and pump and motor in the hydraulic system may be considered conventional for the purpose of the present description, and will not be described in greater detail herein. The control means may be located at any convenient place, either in cab 12 or along the side of the pick-up truck bed.

The base of the dump bed is secured to bottom 20 of the pick-up truck by two side rails 120 and 122 joined integrally by welding or by other suitable securing means to uprights 52 and 54 respectively. The rails 120 and 122 which may be constructed of hollow, square tubing or U-channel iron, are secured to the bed by a plurality of brackets 126, preferably disposed at each end of the rails and attached to the pick-up truck bed by bolts extending downwardly through the bottom of the truck bed.

Since the bed is designed primarily to handle refuse and to transport the refuse from one location to another, it can effectively be used in conjunction with industrial and commercial refuse containers such as the one shown at numeral 130. The container consists of a rectangularly shaped body having wheels or rollers 132 at each corner thereof and has a rod 134 secured to the upper edge of one side and projecting outwardly at opposite corners. The rear end of the bed is provided with outwardly extending rods 136 at each rear corner, and bracket 140 having hooked ends 142 and 144 is hooked on the two outwardly extending ends of rods 134 and 136 at each side of the bed and container. With the brackets attached to the bed and container in the manner illustrated in FIGS. 10 and 11, the lowering of the bed lifts the container.

To assist in lifting the container from the floor and to hold it in an easily transportable position, an extensible and retractable bumper 150 engages the forward side of the container as the bed is lowered and holds the container in the position illustrated in FIG. 7. The bumper structure includes a horizontal bumper member 152 and two side members 154 and 156 slidably mounted in rails 120 and 122, respectively. The bumper can be moved outwardly to any desired position and locked in place by a pin 158 extending through the respective rail and member 154 or 156. If desired, the bumper assembly can be operated by one or two hydraulic cylinders, utilizing the pressure from the system previously described herein for operating the dump bed. In order to retain the bracket firmly in place for more extended hauling operations, a bolt 160 with wing nut 162 may be placed through holes in the end of the bracket adjacent the container, as shown in FIG. 11.

Figure 2:
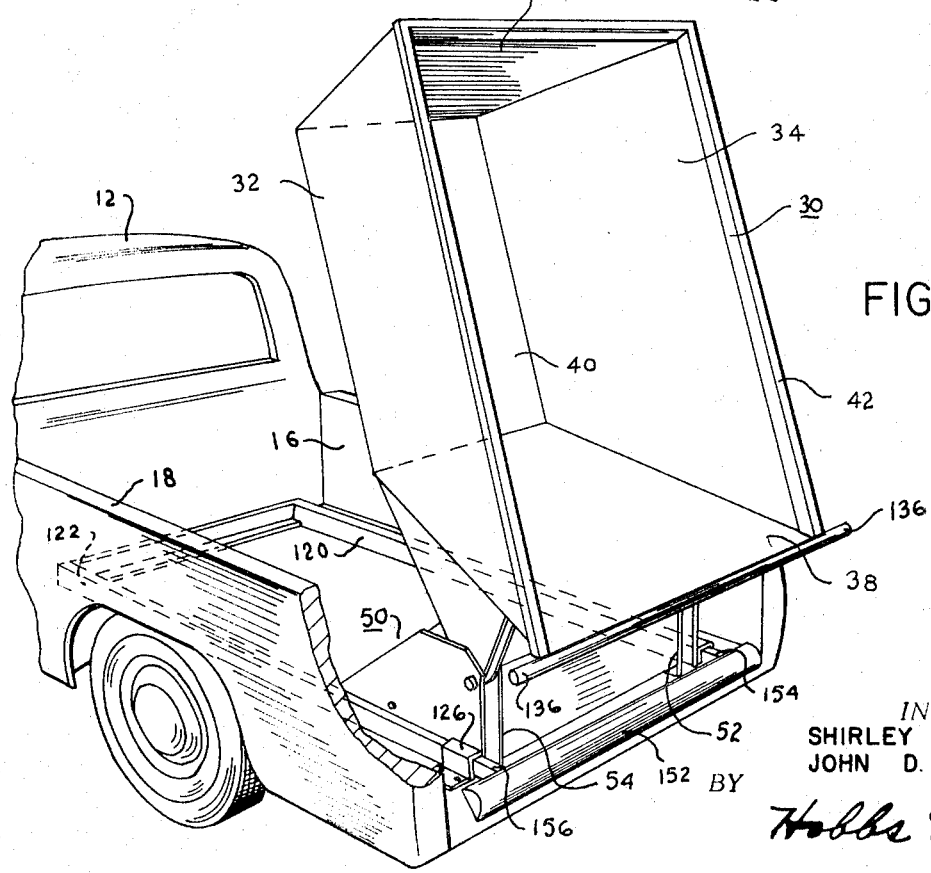
FIG 2 is an enlarged perspective view of the present dump bed, and a fragmentary view of the pick-up truck, the dump bed being shown in its unloading position.
Figure 3:
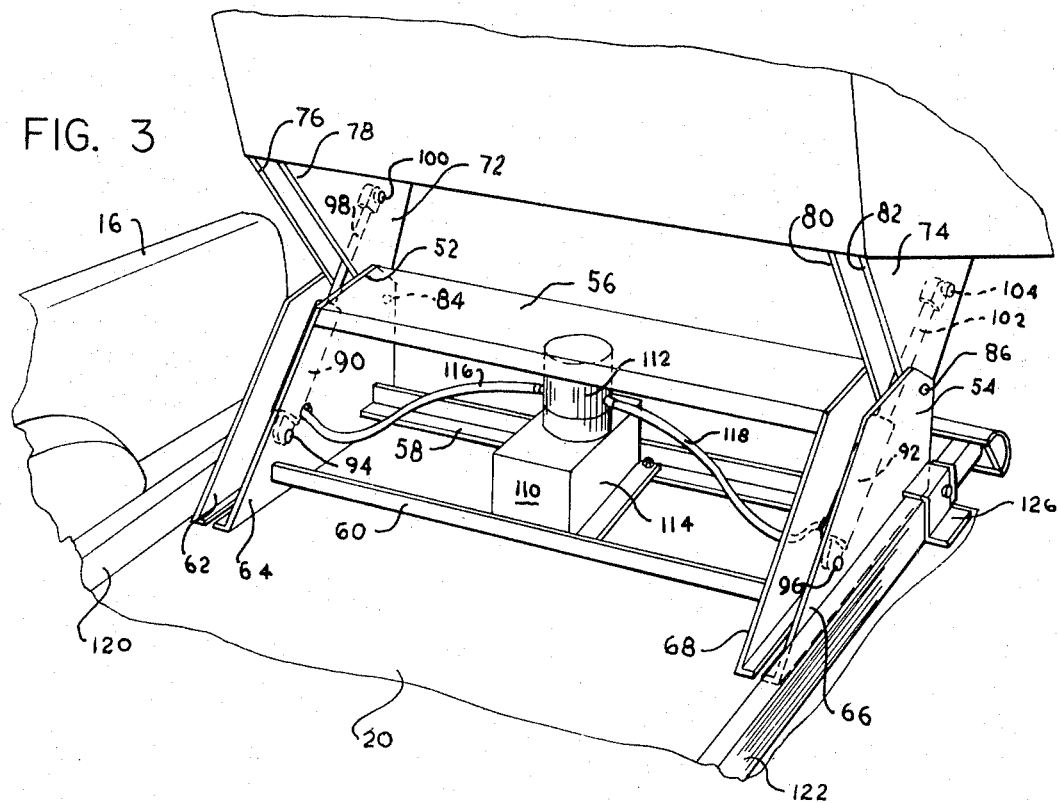
FIG. 3 is an enlarged perspective view of the operating mechanism for the dump bed.
Figure 4:
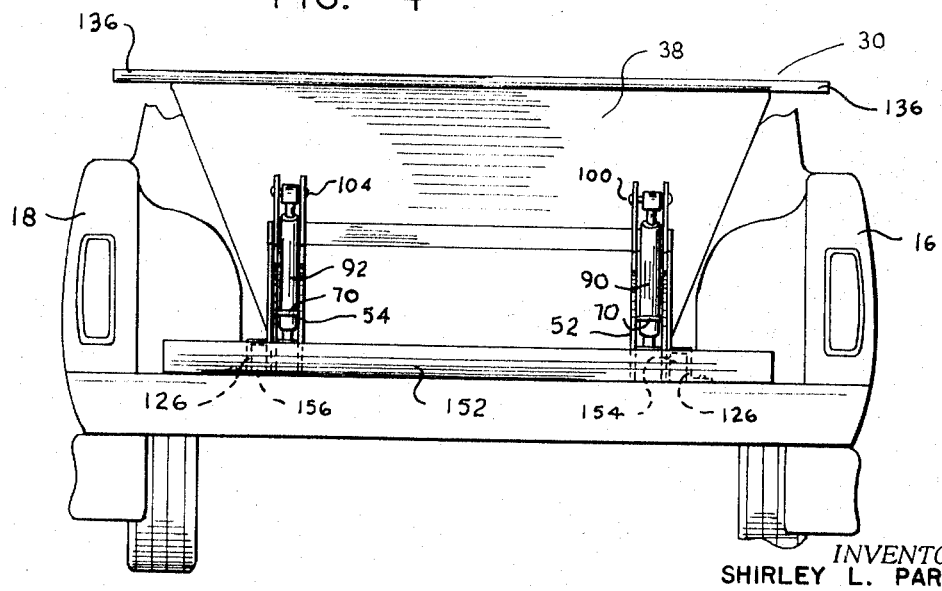
FIG. 4 is a rear end view of the dump bed and the pick-up truck in which the bed is mounted.
Figure 5:
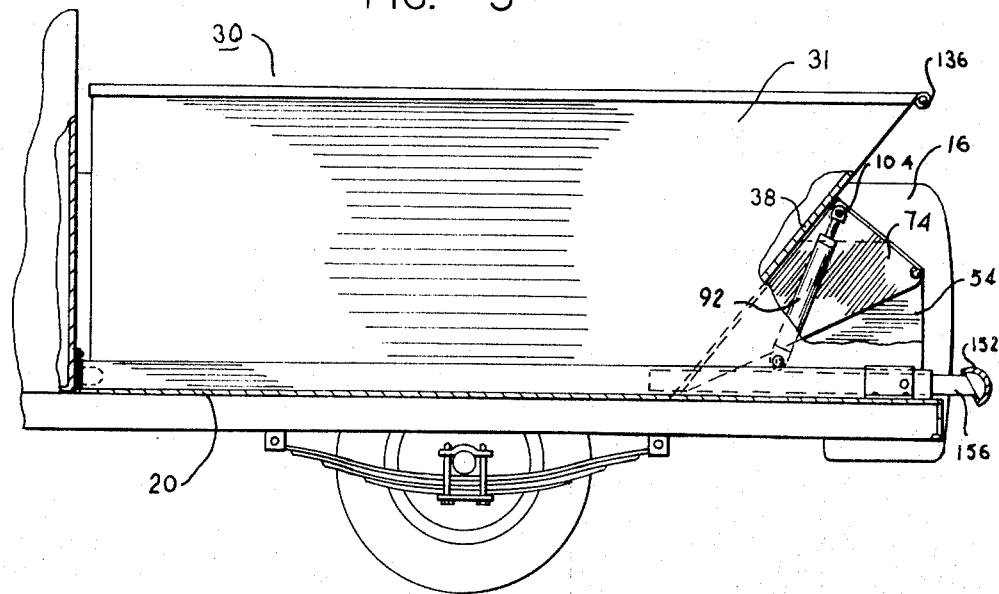
FIG. 5 is a side elevational view of the dump bed and a cross sectional view of the conventional bed of the pick-up truck, the dump bed being shown in its loading position.
Figure 6:
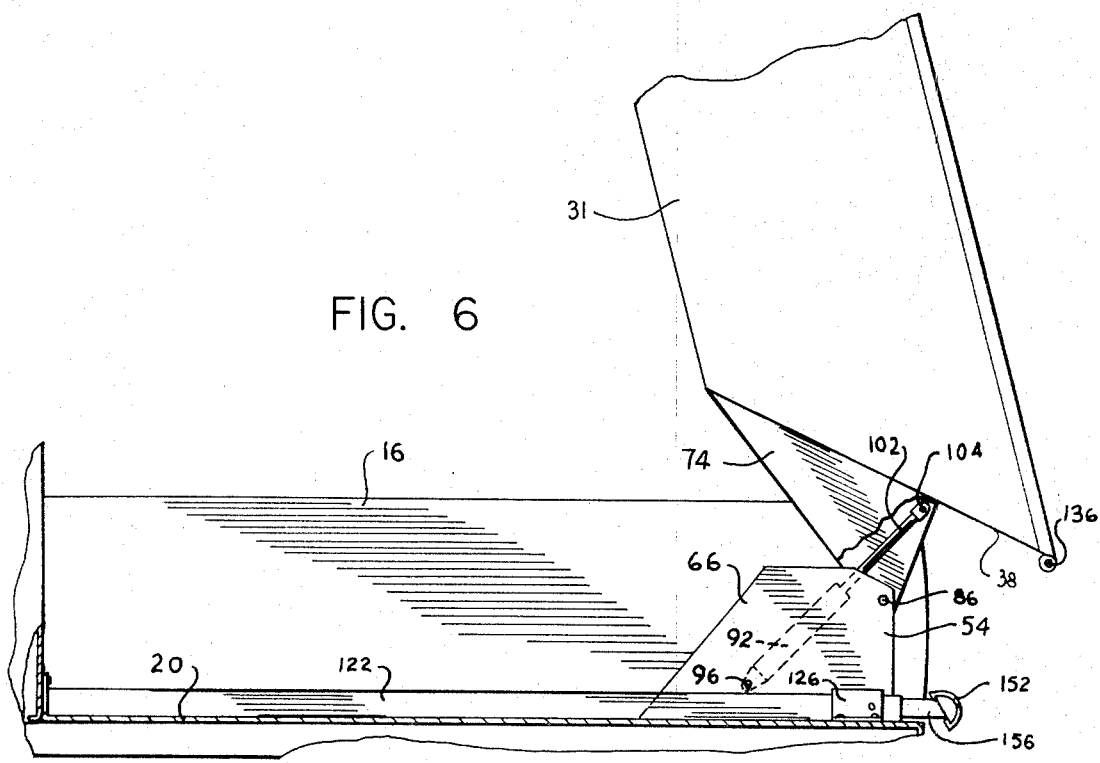
FIG. 6 is a fragmentary side elevational view of the present dump bed, the conventional bed of the puck-up truck being shown in cross section, and the dump bed being shown in its discharge or unloading position.

In the use and operation of the present vehicle dump bed, it is mounted in the bed of a pick-up truck in the manner illustrated in FIGS. 1 and 2, with rails 120 and 122 being secured firmly to bottom 20 of the truck bed. The hydraulic system, including the motor in unit 110, is connected into the electrical system of the truck.

With the bed mounted in the manner illustrated in FIG. 1, operation of the hydraulic system tilts the body to its unloading position illustrated in FIG. 2, where the refuse and other material can be fully removed from the body without removing or opening any gates or doors in the end wall of the body. The body can be emptied in a refuse container such as 130 or it can be emptied directly into the receiving mechanism of a large refuse truck. In the event a container is to be moved, bracket 140 is connected to rods 134 and 136 at each end of the container and body, respectively, and bumper 150 is extended to engage the adjacent side of the container as illustrated in FIG. 8. When the body is lowered, the container is lifted from the ground and held in the position illustrated in FIGS. 7 and 9 where it can be easily transported by the pickup truck from one place to another. When the container is to be returned to the floor, the body is again raised to the position illustrated in FIG. 8, and the bumper retracted to its inoperative position as shown in FIGS. 1 and 2, and the brackets are disconnected from the container and bed. When the pick-up truck is to be used for some other purpose than hauling refuse, the present dump bed can be readily removed from the bed of the pick-up truck by merely loosening several bolts which permit side rails 120 and 122 to be released, thereby releasing the dump bed, which can then be removed from the truck bed by sliding it rearwardly therefrom.

While only one embodiment of the present vehicle dump bed has been described in detail herein, various changes and modifications may be made without departing from the scope of the invention.

We claim:

1. A dump bed for a pick-up truck having a bed, comprising a body for receiving and hauling a load having an outwardly and upwardly extending rear end wall with an upper discharge edge, a pair of uprights disposed along each side of said body near the rear end thereof, each of said uprights having a lower section for seating on a supporting structure on the vehicle and an upper section rigidly connected to the rear end wall of said body and pivotally connected to said lower section at a point intermediate the top and bottom of said end wall, longitudinally disposed frame members secured to said uprights and extending forwardly therefrom for seating in and being secured to the pick-up truck bed, said discharge edge being spaced rearwardly of the rear end of said frame members when said bed is in the dumping position, a hydraulic cylinder means for tilting said upper upright section relative to said lower upright section for moving said bed between load hauling and load dumping positions, and a hydraulic system separate from the hydraulic system of the vehicle for operating said hydraulic cylinder means.

2. A vehicle dump bed as defined in claim 1 in which said hydraulic means consists of a hydraulic cylinder for each upright, each cylinder being connected at one end to said lower section and at the other end to said upper section.

3. A vehicle dump bed as defined in claim 1 in which said uprights are connected by frame members forming a base and said hydraulic system includes a hydraulic pump and an electric driven motor mounted on said base.

4. A vehicle dump bed as defined in claim 1 in which horizontal frame members are connected to said uprights for supporting the body and uprights in a pick-up truck bed, and means are provided for securing said horizontal frame members to the bottom of said supporting structure.

5. A vehicle dump bed as defined in claim 1 in which the rear end of said body is provided with fixture means for lifting and supporting a refuse container.

6. A vehicle dump bed as defined in claim 5 in which a bumper extensible from and retractable toward said uprights engages the forward side of a container when the body lifts the container.

7. A vehicle dump bed as defined in claim 6 in which said bumper includes a horizontally disposed member and two extensible and retractable side members slidable along said horizontal frame members.

* * * * *